United States Patent
Lernoux et al.

(10) Patent No.: US 8,815,377 B2
(45) Date of Patent: Aug. 26, 2014

(54) MULTI-LAYER OPAQUE FILMS, ARTICLES INCLUDING SUCH FILMS, AND USES THEREOF

(75) Inventors: Etienne R. H. Lernoux, Grez-Doiceau (BE); Jerome Sarrazin, Sint Stevens Woluwe (BE)

(73) Assignee: Jindal Films Americas LLC, Macedon, NY (US)

( * ) Notice: Subject to any disclaimer, the term of this patent is extended or adjusted under 35 U.S.C. 154(b) by 38 days.

(21) Appl. No.: 13/500,920

(22) PCT Filed: Nov. 24, 2010

(86) PCT No.: PCT/US2010/057934
§ 371 (c)(1),
(2), (4) Date: May 15, 2012

(87) PCT Pub. No.: WO2011/068728
PCT Pub. Date: Jun. 9, 2011

(65) Prior Publication Data
US 2012/0219779 A1 Aug. 30, 2012

(30) Foreign Application Priority Data
Dec. 3, 2009 (EP) ...................................... 09177934

(51) Int. Cl.
*B32B 7/02* (2006.01)
*B32B 7/12* (2006.01)
*B32B 27/08* (2006.01)

(52) U.S. Cl.
USPC ........................... 428/212; 428/35.7; 428/218

(58) Field of Classification Search
USPC .......................................... 428/35.7, 212, 218
See application file for complete search history.

(56) References Cited

U.S. PATENT DOCUMENTS 6,824,864 B2 * 11/2004 Bader ........................ 428/304.4
2007/0082154 A1   4/2007 Ambroise et al.
2009/0081474 A1   3/2009 Keung

FOREIGN PATENT DOCUMENTS

WO    WO 2005/097492    10/2005

* cited by examiner

*Primary Examiner* — Aaron Austin
*Assistant Examiner* — Lawrence Ferguson

(57) ABSTRACT

A multi-layer film including a cavitated core layer, two skin layers and at least one tie layer between the core layer and one of the skin layers, said tie layer including from about 1 to about 25 wt % of a soft polymer having a density in the range of 0.850 g/cm$^3$ to 0.920 g/cm$^3$ and a Differential Scanning Calorimetry (DSC) melting point in the range of 40° C. to 125° C., said multi-layer film having a density between 0.50 to 0.85 g/cm$^3$.

11 Claims, 2 Drawing Sheets

MULTI-LAYER OPAQUE FILMS, ARTICLES INCLUDING SUCH FILMS, AND USES THEREOF

PRIORITY CLAIM

This application claims priority to and the benefit of EP Application No. 09177934.8, filed Dec. 3, 2009 and PCT/US2010/057934, filed Nov. 24, 2010, the disclosures of which are incorporated by reference in their entireties.

FIELD OF THE INVENTION

This invention relates to multi-layer opaque films comprising a cavitated core layer, two skin layers and at least one tie layer intermediate the core layer and one of the skin layers. More specifically, the invention relates to multi-layer opaque films having improved resistance to core splitting. Finally the invention relates to packaging and labels made from these films.

BACKGROUND OF THE INVENTION

Polypropylene-based multi-layer films are widely used in labeling and packaging applications, such as, for example, pressure sensitive labels or flexible packaging. In some of these applications opaque films obtained by cavitating at least one layer are used. Opaque films are usually produced by cavitating at least the core layer. However the cohesive strength of the cavitated layer might be low and this causes the film to split when its surfaces are submitted to traction forces. Such phenomenon, usually called core splitting, may limit the use of opaque films in applications such as repositionable labels and reclosable packaging.

SUMMARY OF THE INVENTION

It has now been discovered that the resistance to core splitting of multilayer films having a cavitated core layer and two skin layers is improved by adding to such structure at least one tie layer between the core layer and a skin layer, said tie layer comprising one or more soft polymers.

The multi-layer films according to the invention are particularly suitable to produce repositionable labels and reclosable packaging.

Accordingly the present invention relates to multi-layer films comprising a cavitated core layer, two skin layers and at least one tie layer between the core layer and one of the skin layers, said tie layer comprising from about 1 to about 25 wt % of a soft polymer having a density in the range of 0.850 g/cm$^3$ to 0.920 g/cm$^3$ and a Differential Scanning Calorimetry (DSC) melting point in the range of 40° C. to 125° C., the films having a density between 0.50 to 0.85 g/cm$^3$. Preferably the films according to the invention have a density between 0.54 to 0.80 g/cm$^3$.

DETAILED DESCRIPTION OF THE INVENTION

Figure 1:
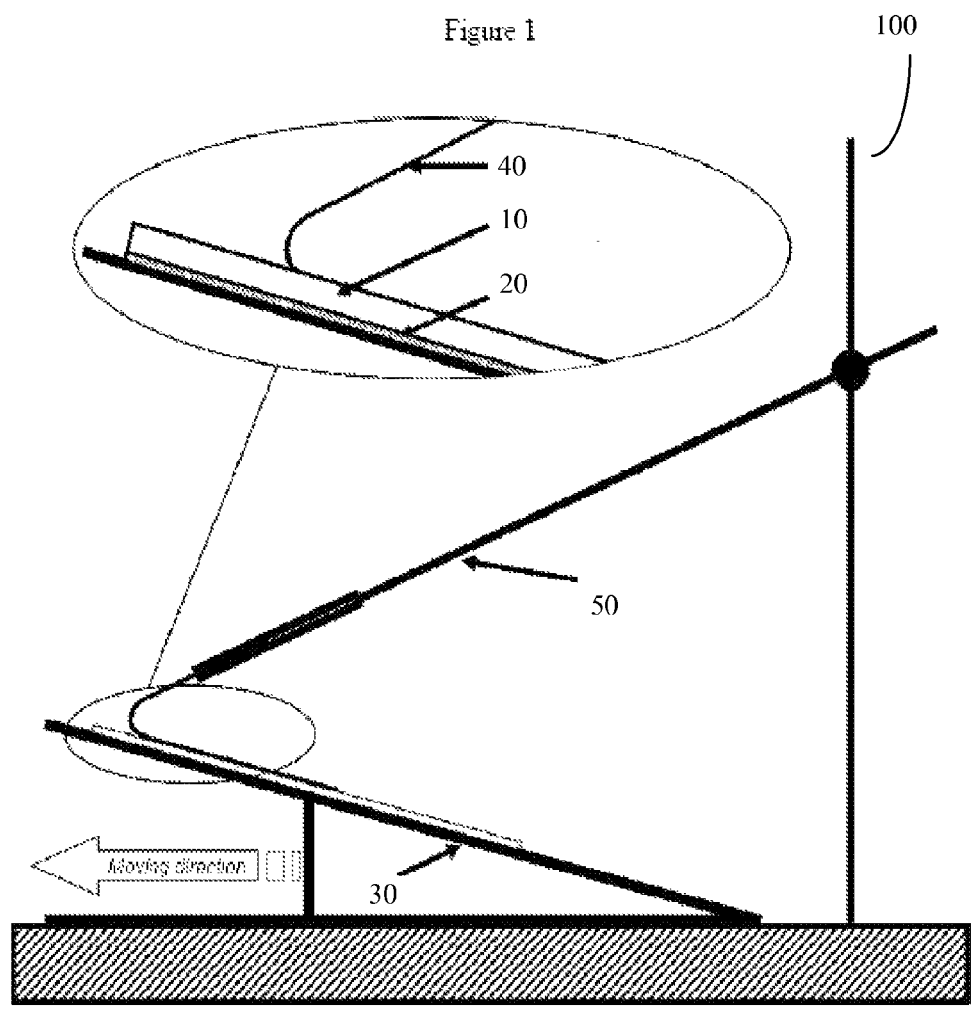
FIG. 1 illustrates the tester used to characterize the core splitting of the films.

The core layer of multi-layer films according to the invention generally comprises a propylene homopolymer, an ethylene-propylene copolymer or any combination thereof and at least one cavitating or void-initiating additive to create the opaque film. In a preferred embodiment, the core layer comprises at least 70 wt % based on the total core layer of a propylene homopolymer or of a random copolymer of propylene and ethylene containing less that 4 wt % of ethylene. The core layer polymer used in the films according to the invention is more preferably an isotactic propylene homopolymer. Isotactic propylene homopolymers usable according to the present invention have triad tacticity of three propylene units, as measured by $^{13}$C NMR, of 90% or greater, or even 92% or greater. The propylene homopolymer and/or the ethylene-propylene copolymers may be the only polymer(s) used to produce the core layer. They may also be blended with other polymer(s) preferably with different alpha-olefin polymers that may come from recycling of the edge trims or from reclaimed films. It is contemplated that the propylene homopolymer and/or the ethylene-propylene copolymer comprises at least 90 wt %, preferably at least 92 wt % and more preferably at least 95 wt % of the total weight of polymer(s) present in the core layer, with the exception of any polymer used as cavitating additive.

The cavitating or void-initiating additives include any suitable organic or inorganic material that is incompatible with the core layer polymer material at the temperature of orientation. Examples of suitable void-initiating particles are polybutene terephthalate (PBT), nylon, solid or hollow preformed glass spheres, metal beads or spheres, ceramic spheres, calcium carbonate, talc, chalk, or combination thereof. The average diameter of the void-initiating particles typically may be from about 0.1 to 10 μm. These void initiating particles may be present in the core layer at less than 30 wt %, preferably less than 25 wt %, most preferably in the range of from 2-20 wt %, based on the total weight of the core layer.

According to a specific embodiment the core layer comprises at least 85 wt % of propylene homopolymer and up to 15 wt % of a cavitating additive selected from PBT and calcium carbonate.

The core layer may contain other additives such as inorganic fillers, pigments, antioxidants, acid scavengers, ultraviolet absorbers, processing aids such as zinc stearate, extrusion aids, slip additives, permeability modifiers, antistatic additives and β-nucleating agents.

Preferably the total amount of additive(s) in the core layer comprises less than 30 wt % of the total weight of the core layer. Core layers comprising less than 25 wt %, advantageously from 2 to 20 wt % of additive(s) based on the total weight of the core layer provide good results.

The core layer preferably has a thickness in the range of from about 5 μm to 100 μm, more preferably from about 15 to 60 μm. The core layer thickness is measured according to the method described below in relation with the examples.

The multilayer films according to the invention comprise two skin layers. As is known in the art, the skin layers are provided to improve the films barrier properties, processability, printability, and/or compatibility for metallization, coating and lamination to other films or substrates. The skin layers of the films according to the invention generally comprise at least one polymer selected from ethylene homo- or copolymers, propylene homo- or copolymers, ethylene-propylene-butene terpolymer, propylene-butene copolymer, ethylene-vinyl alcohol (EVOH) polymer, and combination thereof. Polymers comprising units derived from propylene, ethylene and/or butene are generally preferred. The skin layers may be made of different polymer(s) or of the same polymer(s) in different or in the same ratio. The skin layers may also advantageously contain other additives such as pigments, antioxidants, acid scavengers, ultraviolet absorbers, processing aids, extrusion aids, antiblock, slip additives or antistatic additives. Preferably the skin layers are free of cavitating or void-initiating additives.

The thickness of the skin layers as measured below depends upon their intended function but is typically in the range of from about 0.5 μm to about 3.5 μm, preferably from about 0.5 μm to about 2 μm and in many embodiments most preferably from about 0.5 μm to about 1.5 μm.

The films according to the invention comprise at least one tie layer between the core layer and at least one skin layer. Preferably one side of the tie layer is in direct contact with the core layer and the other side of the tie layer is in direct contact with the skin layer. According to one embodiment, the tie layer is between the core layer and the skin layer that will be coated with an adhesive. Preferably the films of the invention comprise a second tie layer between the core layer and the second skin layer. The second tie layer may be made of different polymer(s) or of the same polymer(s) in different or in the same ratio.

Soft polymers usable in the tie layer include propylene based elastomers, ethylene based plastomers, metallocene catalysed linear low density polyethylenes as defined hereafter and combination thereof.

Propylene based elastomers have a heat of fusion ($H_f$) less than or equal to 75 J/g and a triad tacticity of three propylene units, as measured by $^{13}$C NMR, of 75% or greater, or even 90% or greater. The lowered $H_f$ may result from stereo- or regio-errors and/or from the incorporation of one or more units derived from a comonomer of a $C_2$ or $C_4$-$C_{20}$ alpha-olefin and optionally diene-derived units. Such propylene-alpha-olefin elastomers can comprise between 6 to 25 wt % alpha-olefin and more preferably more than 7 wt % alpha-olefin. Polypropylene-based elastomers comprising from 8 to 12 wt % ethylene are particularly suitable.

Triad tacticity is determined as in US-A-20040236042. The propylene-alpha-olefin elastomers may have an $H_f$ which is greater than or equal to 0.5 J/g and preferably less than or equal to about 50 J/g. The $H_f$ is determined as in ASTM E-794-95 (version E-794-01). Preferred propylene-alpha olefin elastomers have a Mooney viscosity [ML (1+4) @ 125° C.], determined according to ASTM D1646, of less than 100, preferably less than 60 or less than 30. The molecular weight distribution index (Mw/Mn) of the propylene-alpha olefin elastomers may be from 1.8 to 3 as determined by Gel Permeation Chromatography (GPC). Propylene-based elastomers may be produced by different types of single site catalysts such as bridged metallocenes (see WO199907788), pyridine amines (see WO03/040201) and unbridged metallocenes (see U.S. Pat. No. 5,969,070), preferably in a solution process. Propylene-based elastomers are commercially available from ExxonMobil Chemical Company under the trade name of Vistamaxx™. Some of these materials are further available from the Dow Chemical Company under the trade name Versify™.

Ethylene based plastomers are very low density linear polyethylenes (VLDPE) having a density between 0.85 g/cm$^3$ to 0.91 g/cm$^3$ determined according to ASTM D1505. Ethylene based plastomers contain a sufficient quantity of units derived from a $C_3$ to $C_{10}$ comonomer, preferably $C_4$ to $C_8$, alpha-olefins to establish the right density. Ethylene-based plastomers are preferably produced in solution or under high pressure conditions using single site catalysts such bis-cyclopentadienyl or mono-cyclopentadienyl metallocenes.

Such plastomers are commercialised by ExxonMobil under the trade name of Exact™, by Dow under the trade name of Affinity™ and by Mitsui under the trade name of Tafmer™.

Metallocene linear low density polyethylenes (LLDPE's) have a density of from 0.91 g/cm$^3$ to 0.94 g/cm$^3$ determined according to ASTM D1505. They may be produced in solution, slurry or gas phase conditions using a single site catalyst, such as a metallocene activated by methods well known for such components, for example, with aluminoxane or a non-coordinating anion. Low melt index ratio linear polyethylene polymer is a linear polyethylene with a shear sensitivity expressed as melt index ratio 121.6/12.16 ratio (MIR) as determined by ASTM-1238 Condition 2.16 kg and 21.6 kg, 190° C. of less than 30. The low MIR indicates no or a low level of long chain branches as well as a narrow molecular weight distribution. High MIR linear polyethylenes include LLDPE's with an MIR of more than 30 which in combination with a relatively low Mw/Mn value is generally accepted to be indicative of the presence of long chain branching. These polymers may be referred to as "homogeneously branched linear polyethylenes." The branches are believed to be linear in structure and may be present at a level where no peaks can be specifically attributed to such long chain branches in the $^{13}$C NMR spectrum. Metallocene LLDPE's are commercialised by ExxonMobil under the trade name of Exceed™ and Enable™ and by Dow under the name of Elite™.

Tie layer including propylene based elastomers such as Vistamaxx, ethylene based plastomer such as Exact, or blend thereof generally provides improved mechanical dissipative power.

The tie layer used in the films according to the invention preferably comprises less than 10 wt % of soft polymer, and typically from 4 to 8 wt % of soft polymer. The tie layer further comprises from 75 to 99 wt %, preferably at least 90 wt % and more preferably from 92 to 96 wt % of at least one other polymer such as alpha-olefin polymer having a higher melting point than the soft polymer or blend thereof. Polypropylene homopolymer or copolymer of propylene containing less than 4 wt % of ethylene are preferred.

Tie layer(s) may comprise additives such as pigments, processing aids, extrusion aids, antiblocks, slip additives, or antistatic additives.

The thickness of the tie layer is usually in the range of from about 0.5 μm to 20 μm, preferably from about 1 μm to about 10 μm, and most preferably from 1 to 6 μm.

According to a preferred embodiment, the multi-layer film according to the invention is a five layer film comprising a cavitated core layer comprising at least 90 wt % of an isotactic propylene homopolymer, a first skin layer comprising a propylene-butene-ethylene terpolymer, a second skin layer comprised of a propylene-butene-ethylene terpolymer and a tie layer between the core layer and each of the skin layer, said tie layers comprising less than 10% of a soft polymer, at least 90% of a propylene homopolymer and a pigment, the density of the film being in the range of from 0.50 to 0.85 g/cm$^3$.

The films of the present invention can be produced by any known method. The films may be obtained by extrusion or coextrusion through cast die or annular die. The films are usually oriented in both the machine direction (MD) and the transverse direction (TD).

The following method may be used. Using a plurality of extruders, the resins are melted coextruded from the T-die, solidified by cooling with a chilled roll, roll stretched in the MD, tenter-stretched in the TD, heat set, cooled, optionally subjected to corona discharge treatment and/or flame treatment at least on one surface, and wound up with a winder, thus obtaining a film. Orientation may be accomplished by stretching or pulling a blown film in the MD, using a blow-up ratio to accomplish TD orientation. Blown films or cast films may also be oriented by a tenter-frame orientation subsequent to the film extrusion process, again in one or both directions. Orientation may be sequential or simultaneous, depending upon the desired film features. Orientation ratios may generally be in the range of 1:3-1:6 in the machine direction (MD) or 1:4-1:10 in the transverse direction (TD). Preferred orientation ratios are commonly from between about three to about six times in the machine direction and between about four to about ten times in the transverse direction.

The films according to the invention may also be taken through secondary processes. This includes, corona and/or flame plasma treatments, metallization through vacuum metallization, printable topcoat applied as needed to enhance the decorative nature of the label, lamination, or protecting coating, such as lacquers. The films according to the invention are useful in many films application such as flexible packaging and labeling articles.

The following examples and accompanying drawings serve as an illustration of the invention, the measured features and the units for their expressions are explained hereafter.

The stiffness of the multilayer films of the present invention is measured by using a Handle O Meter according to the ASTM D2923-70 and is provided in g/15 mm. The stiffness in the MD may be generally of at least 25 g/15 mm, preferably at least 20 g/15 mm. Value of between 30 and 40 are easily obtained. The stiffness in the TD according to the invention is generally of at least 40 g/15 mm, preferably at least 30 g/15 mm. Value of between 45 and 60 are easily obtained. Accordingly the oriented films according to the invention can be used in labeling at high line speeds and in flexible packaging applications.

Elastic modulus in MD or TD is measured according to ASTM D 882. The modulus in MD according to the invention may be of at least 1000 N/mm, preferably at least 1200 N/mm. The modulus in TD according to the invention is generally of at least 1800 N/mm, preferably at least 2000 N/mm.

Light transmission of the films according to the invention, measured according to ASTM D 1003, is usually of less than 40.

The density of the films according is measured by dividing the weight of a sample of known volume with the thickness of the film determined by means of a micrometer, said thickness being called Optical Gauge.

The ratios of the thicknesses of the various layers are determined by optical microscopy of a cross section of the film. The thickness of the various layers is then obtained by multiplying the corresponding ratio by the Optical Gauge.

Examples 1 to 4 According to the Invention and Comparative Examples 1 and 2

The films of the examples are 5 layers BOPP cavitated films made under the conditions described above. Structure is ABCBA, wherein the A layers are the skin layers, the B layers are the tie layers and the C layer is the cavitated core layer.

The composition of the layers is given in Table 1 below wherein:

Adsyl® 5C39F is a propylene-ethylene-butene terpolymer commercialized by LyondellBasell;

ExxonMobil PP4612 is a propylene homopolymer commercialized by ExxonMobil;

Compound 511094 is a compound containing propylene homopolymer and titanium dioxide ($TiO_2$) in an amount of 50% commercialised by Ampacet USA;

Vistamaxx® 3980 is a propylene based elastomer commercialized by ExxonMobil having a peak melting point at 77° C.; and Valox® 195 is a PBT commercialized by Sabic Innovative Plastics.

TABLE 1

| Layer | Example 1 | Example 2 | Example 3 |
|---|---|---|---|
| A | 100% Adsyl 5C39F | 100% Adsyl 5C39F | 100% Adsyl 5C39F |
| B | 90% ExxonMobil PP4612 + 8% compound 511094 + 2% Vistamaxx 3980 | 87% ExxonMobil PP4612 + 8% compound 511094 + 5% Vistamaxx 3980 | 82% ExxonMobil PP4612 + 8% compound 511094 + 10% Vistamaxx 3980 |
| C | 93% ExxonMobil PP4612 + 7% Valox 195 | 93% ExxonMobil PP4612 + 7% Valox 195 | 93% ExxonMobil PP4612 + 7% Valox 195 |

| Layer | Example 4 | Comparative Example 1 | Comparative Example 2 |
|---|---|---|---|
| A | 100% Adsyl 5C39F | 100% Adsyl 5C39F | 100% Adsyl 5C39F |
| B | 72% ExxonMobil PP4612 + 8% compound 511094 + 20% Vistamaxx 3980 | 92% ExxonMobil PP4612 + 8% compound 511094 | 80% ExxonMobil PP4612 + 20% compound 511094 |
| C | 93% ExxonMobil PP4612 + 7% Valox 195 | 93% ExxonMobil PP4612 + 7% Valox 195 | 97% ExxonMobil PP4612 + 3% Valox 195 |

The following stretching conditions were applied: MDX=5.0 and TDX=8.5.

The properties of the films from Examples 1 to 4 and Comparative Examples 1 and 2 are as follows:

TABLE 2

| | Optical gauge μm | Density g/cm³ | Light Transmission % | Machine Direction | | Transverse Direction | |
|---|---|---|---|---|---|---|---|
| | | | | Modulus N/mm | Stiffness g/15 mm | Modulus N/mm | Stiffness g/15 mm |
| Ex. 1 | 44.02 | 0.62 | 26.2 | 1189 | 37.65 | 2089 | 55.65 |
| Ex. 2 | 43.77 | 0.62 | 26.4 | 1265 | 37.40 | 2044 | 55.40 |
| Ex. 3 | 43.94 | 0.62 | 26.8 | 1276 | 36.55 | 2010 | 53.15 |
| Ex. 4 | 43.69 | 0.62 | 27.3 | 1234 | 34.85 | 1827 | 45.15 |
| C. Ex. 1 | 44.28 | 0.62 | 26.9 | 1348 | 37.55 | 2113 | 56.80 |
| C. Ex. 2 | 35.22 | 0.80 | 37.0 | 1748 | 25.45 | 2565 | 34.60 |

Peeling properties of the films from Examples 1 to 4 and Comparative Examples 1 and 2 were tested by the means of a Release and Adhesion Tester from the company Testing Machines Incorporated.

FIG. 1 shows the instrumental setup 100. The film sample 10 is laid down on a double sided tape 20 adhering to the testing bench 30. A piece of adhesive tape 40 (Scotch® 610 commercialised by 3M) is laid down on the film sample 10 with one end attached to the mechanical arm 50 of the testing machine 100. This arm 50 makes an angle of 135° with the bench 30 and is equipped with a force transducer (not shown). The test consists in moving the bench 30 into the opposite direction in order to peel the tape 40 on the film sample 10. The speed of the bench 30 is of 3048 cm/min. Peeling force is measured by the force transducer of the mechanical arm 50 and recorded as a function of the distance. An average adhesion force and a peak adhesion force are calculated (in g/25 mm). The peeling direction can be the machine direction (MD) or the transverse direction (TD).

The following behaviours may be observed:
1—the tape peels, no damage to the film; in the following we refer to this as peeling;
2—the film breaks partially, and one or more layers remain on the tape; in the following we refer to this as skin delamination (SD) when only the skin and tie layers are removed from the film or core splitting (CS) when the fracture attains and propagates into the cavitated core;
3—the film skin layer is partially lifted from the tie layer without being torn up, in the following we refer to this as blistering; and
4—the film breaks and tears throughout its entire thickness; in the following we refer to this as tear.

The peeling length in Table 3 corresponds to the largest length without core splitting, skin delamination, or film tear. For defect free films, this length is of 120 mm, corresponding to the length of the peeling test.

Results of this test for each film of Examples 1 to 4 and Comparative Examples 1 and 2 are presented in Table 3.

TABLE 3

| Film | Sample number | Peeling direction | Failure (Y/N) | Failure type | Average force g/25 mm | Maximum force g/25 mm | Peeling length mm |
|---|---|---|---|---|---|---|---|
| Ex. 1 | 1 | MD | Y | CS | 1231.8 | 1568.0 | 36 |
| Ex. 1 | 2 | MD | Y | CS | 982.2 | 1181.7 | 18 |
| Ex. 1 | 3 | MD | Y | CS | 1498.3 | 1924.4 | 65 |
| Ex. 1 | 4 | MD | Y | CS | 1345.4 | 1765.2 | 41 |
| Ex. 1 | 5 | MD | Y | CS | 1298.2 | 1682.4 | 20 |
| Ex. 1 | 6 | MD | Y | CS | 1423.3 | 1802.1 | 83 |
| Ex. 1 | 7 | MD | Y | CS | 1278.7 | 1562.2 | 49 |
| Ex. 1 | 8 | MD | Y | CS | 1273.5 | 1730.5 | 53 |
| Ex. 1 | 9 | MD | Y | CS | 1365.8 | 1686.2 | 43 |
| Ex. 1 | 10 | MD | Y | CS | 1293.5 | 1763.0 | 71 |
| Ex. 2 | 1 | MD | Y | CS | 1219.2 | 1527.5 | 40 |
| Ex. 2 | 2 | MD | Y | CS | 1529.5 | 1983.7 | 100 |
| Ex. 2 | 3 | MD | Y | CS | 1184.1 | 1584.1 | 47 |
| Ex. 2 | 4 | MD | Y | CS | 1404.7 | 1797.8 | 65 |
| Ex. 2 | 5 | MD | Y | CS | 1356.8 | 1722.7 | 48 |
| Ex. 2 | 6 | MD | N |  | 1458.8 | 1837.9 | 120 |
| Ex. 2 | 7 | MD | Y | CS | 1378.6 | 1720.5 | 64 |
| Ex. 2 | 8 | MD | Y | CS | 1542.2 | 2029.3 | 70 |
| Ex. 2 | 9 | MD | Y | CS | 1100.0 | 1576.6 | 45 |
| Ex. 2 | 10 | MD | Y | CS | 1106.9 | 1533.8 | 32 |
| Ex. 3 | 1 | MD | N |  | 1256.0 | 1915.4 | 120 |
| Ex. 3 | 2 | MD | Y | CS + Tear | 1167.2 | 1601.3 | 20 |
| Ex. 3 | 3 | MD | Y | CS | 1514.2 | 1924.8 | 110 |
| Ex. 3 | 4 | MD | Y | CS | 1321.7 | 1743.6 | 95 |
| Ex. 3 | 5 | MD | Y | CS | 1042.4 | 1723.7 | 70 |
| Ex. 3 | 6 | MD | N |  | 1526.1 | 1829.0 | 120 |
| Ex. 3 | 7 | MD | N |  | 1479.8 | 1887.1 | 120 |
| Ex. 3 | 8 | MD | N |  | 1531.2 | 1888.6 | 120 |
| Ex. 3 | 9 | MD | Y | CS | 1018.9 | 1627.3 | 80 |
| Ex. 3 | 10 | MD | Y | CS | 1245.6 | 1559.6 | 45 |
| Ex. 4 | 1 | MD | Y | SD | 1148.4 | 1458.9 | 8 |
| Ex. 4 | 2 | MD | Y | SD | 1138.4 | 1639.4 | 5 |
| Ex. 4 | 3 | MD | Y | SD | 1120.9 | 1438.6 | 6 |
| Ex. 4 | 4 | MD | Y | SD | 1068.9 | 1462.6 | 6 |
| Ex. 4 | 5 | MD | Y | SD | 1115.6 | 1501.8 | 6 |
| Ex. 4 | 6 | MD | Y | SD | 1097.2 | 1497.6 | 6 |
| Ex. 4 | 7 | MD | Y | SD | 1120.9 | 1505.1 | 5 |
| Ex. 4 | 8 | MD | Y | SD | 868.4 | 1339.0 | 6 |
| Ex. 4 | 9 | MD | Y | SD | 1113.1 | 1482.4 | 6 |
| Ex. 4 | 10 | MD | Y | SD | 1109.2 | 1565.9 | 7 |
| C. Ex. 1 | 1 | MD | Y | CS | 1197.4 | 1623.7 | 33 |
| C. Ex. 1 | 2 | MD | Y | CS | 1105.0 | 1382.9 | 17 |
| C. Ex. 1 | 3 | MD | Y | CS | 1292.1 | 1622.1 | 20 |
| C. Ex. 1 | 4 | MD | Y | CS | 1348.9 | 1815.0 | 70 |
| C. Ex. 1 | 5 | MD | Y | CS | 1207.1 | 1514.1 | 30 |
| C. Ex. 1 | 6 | MD | Y | CS | 1224.5 | 1603.4 | 33 |
| C. Ex. 1 | 7 | MD | Y | CS | 1322.0 | 1705.7 | 59 |
| C. Ex. 1 | 8 | MD | Y | CS | 1219.3 | 1486.3 | 22 |
| C. Ex. 1 | 9 | MD | Y | CS | 1397.8 | 1859.2 | 73 |
| C. Ex. 1 | 10 | MD | Y | CS | 1205.8 | 1575.7 | 27 |
| C. Ex. 2 | 1 | MD | N |  | 1766.4 | 2351.2 | 120 |
| C. Ex. 2 | 2 | MD | Y | Tear | 1765.0 | 2324.2 | 80 |
| C. Ex. 2 | 3 | MD | Y | Tear | 1645.0 | 2166.8 | 80 |
| C. Ex. 2 | 4 | MD | N |  | 1628.8 | 2234.0 | 120 |
| C. Ex. 2 | 5 | MD | Y | Tear | 1772.1 | 2051.8 | 70 |
| C. Ex. 2 | 6 | MD | Y | Tear | 1587.7 | 2192.7 | 90 |
| C. Ex. 2 | 7 | MD | Y | Tear | 1488.5 | 1898.1 | 75 |
| C. Ex. 2 | 8 | MD | Y | Tear | 1706.3 | 1945.5 | 75 |
| C. Ex. 2 | 9 | MD | Y | Tear | 1597.1 | 1866.5 | 65 |
| C. Ex. 2 | 10 | MD | Y | Tear | 1506.3 | 1851.6 | 70 |

The addition of a soft polymer in the tie layers according to the invention (Examples 1 to 4) modifies the behavior of the BOPP cavitated films of same density (Comparative Example 1) by reducing the core splitting occurrence and the surface affected (e.g., the core splitting occurs after a larger peeling length). In the case of Example 3, the core splitting occurrence is reduced significantly. In the case of Example 4, the mechanical failure does not occur in the core but at the interface between the skin layer and the tie layer. The films of Comparative Example 2 having a higher density does not exhibit core splitting but tear at high peeling force.

The films from Example 3 and Comparative Example 1 were coated with a water-based pressure sensitive adhesive (PSA) A225 commercialised by BASF. An adhesive weight of 4 g/m² was deposited and the films were dried during 2 minutes at ambient temperature (23° C.) and 3 minutes in an oven at 80° C. The films were then tested with the Release and Adhesion Tester from TMI under the same conditions as previously, except that the adhesivated side of the film is laid down onto the bench itself.

Results are shown in Table 4.

TABLE 4

| Film | Sample number | Peeling direction | Failure (Y/N) | Failure type | Average force g/25 mm | Maximum force g/25 mm | Peeling length mm |
|---|---|---|---|---|---|---|---|
| Ex. 3 | 1 | MD | N | | 1611.2 | 2050.1 | 120 |
| Ex. 3 | 2 | MD | N | | 1688.0 | 2089.9 | 120 |
| Ex. 3 | 3 | MD | N | | 1067.0 | 2494.0 | 120 |
| Ex. 3 | 4 | MD | N | | 1168.3 | 2154.8 | 120 |
| Ex. 3 | 5 | MD | Y | CS | 1584.6 | 1943.4 | 80 |
| Ex. 3 | 6 | MD | N | | 1587.7 | 2083.3 | 120 |
| Ex. 3 | 7 | MD | N | | 1661.2 | 2497.3 | 120 |
| Ex. 3 | 8 | MD | N | | 1346.9 | 1734.8 | 120 |
| Ex. 3 | 9 | MD | N | | 1490.0 | 1957.9 | 120 |
| Ex. 3 | 10 | MD | N | | 1693.6 | 2112.0 | 120 |
| C. Ex. 1 | 1 | MD | N | | 1366.5 | 1691.9 | 120 |
| C. Ex. 1 | 2 | MD | Y | CS | 1318.6 | 1529.9 | 75 |
| C. Ex. 1 | 3 | MD | Y | CS | 934.6 | 1594.6 | 75 |
| C. Ex. 1 | 4 | MD | Y | CS | 1281.0 | 1562.0 | 60 |
| C. Ex. 1 | 5 | MD | N | | 1012.4 | 1695.1 | 120 |
| C. Ex. 1 | 6 | MD | Y | CS | 1060.0 | 1502.5 | 35 |
| C. Ex. 1 | 7 | MD | Y | CS | 1372.8 | 1777.5 | 85 |
| C. Ex. 1 | 8 | MD | N | | 1343.6 | 1796.4 | 120 |
| C. Ex. 1 | 9 | MD | N | | 1419.9 | 1812.6 | 120 |
| C. Ex. 1 | 10 | MD | Y | CS | 1348.7 | 1654.9 | 75 |

The mechanical behaviors of the films of Example 3 and Comparative Example 1 coated with a water-based PSA show significant differences with each other. The addition of 10% of a soft polymer in the tie layer of a BOPP cavitated film of same density allows reducing the core splitting occurrence from 60% to 10%.

The films from Example 1 to 4 and Comparative Examples 1 and 2 were laminated to a release BOPP film 19CSR-2 from ExxonMobil and then coated on the reverse side first with acrylic and then with a cold seal adhesive S8113 from Swale.

These films were then tested on the Release and Adhesion Tester in 2 tests:

Test 1: the release side is laid down onto the double sided tape and the tape Scotch® 610 is laid down the cold seal side; and Test 2: the film is sealed onto itself (cold seal-cold seal sealing) by the means of a sealer Brugger HSG/ETK equipped with crimp jaws.

The sealing conditions are as follows: 23° C., pressure 6 bars applied during 1 sec.

Each test is replicated 2 times.
Results can be found in Table 5.

TABLE 5

| | Core splitting Occurrence (%) | | | |
|---|---|---|---|---|
| | Machine Direction | | Transverse Direction | |
| Film | Test 1 | Test 2 | Test 1 | Test 2 |
| C. Ex. 1 | 50% | 100% | 50% | 50% |
| C. Ex. 2 | 0% | 25% | 0% | 0% |
| Ex. 1 | 25% | 25% | 50% | 75% |
| Ex. 2 | 50% | 25% | 0% | 0% |
| Ex. 3 | 0% | 25% | 0% | 0% |
| Ex. 4 | 50% | 0% | 100% | 100% |

Test 1: Tape on cold seal
Test 2: Cold seal on cold seal

At equal film density, the films containing a soft polymer in the tie layers according to the invention exhibit an improved resistance to core splitting. Increasing the density of the films, i.e., reducing the films cavitation reduces the core splitting.

The release BOPP laminated, cold seal coated films were then transformed on a FlowPack horizontal packaging machine to provide packages typical of the reclosable package application.

Packages were then open just after packaging (Ageing 0) and/or after 24 hours (Ageing 24). The core splitting occurrence in the MD is then recorded.

Results can be found in Table 6.

TABLE 6

| Film | Ageing | MD core splitting | MD core splitting |
|---|---|---|---|
| Ex. 1 | 0 | 8/40 | 20% |
| Ex. 2 | 0 | 7/40 | 18% |
| Ex. 3 | 0 | 1/40 | 3% |
| | 24 | 3/80 | 4% |
| Ex. 4 | 0 | 9/40 | 23% |
| | 24 | 3/34 | 9% |
| C. Ex. 1 | 0 | 7/59 | 12% |
| | 24 | 27/79 | 34% |
| C. Ex. 2 | 0 | 2/40 | 5% |
| | 24 | 6/40 | 15% |

Figure 2:
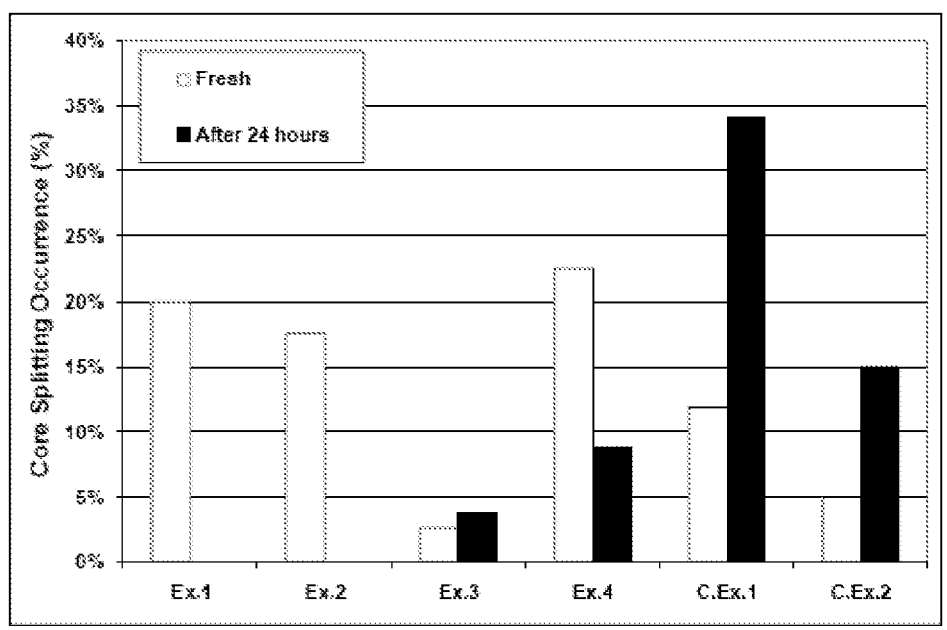
FIG. 2 illustrates the core splitting of the films produced in the examples.

FIG. 2 shows the core splitting occurrence of the packages.

Core splitting occurrence after 24 hours is significantly reduced for Examples 3 and 4 compared with Comparative Example 1.

This disclosure is merely illustrative and descriptive of the invention by way of example and various changes can be made by adding, modifying, or eliminating details without departing from the fair scope of the teaching contained in the disclosure. It will be recognized by those skilled in the art that various changes to the embodiments or methods herein as well as in the details may be made within the scope of the attached claims without departing from the spirit of the invention. However, such modifications and adaptations are within the spirit and scope of the present invention.

The invention claimed is:

1. A multi-layer film comprising a cavitated core layer, two skin layers and at least one tie layer between the core layer and one of the skin layers, said tie layer comprising from about 1 to about 25 wt % of a soft polymer having a density in the range of 0.850 g/cm$^3$ to 0.920 g/cm$^3$ and a Differential Scanning Calorimetry (DSC) melting point in the range of 40° C. to 125° C., and from 75 to 99 wt % of at least one alpha-olefin polymer having a higher DSC melting point than the soft polymer or blend thereof, said multi-layer film having a density between 0.50 to 0.85 g/cm$^3$.

2. The multi-layer film according to claim 1, having a density between 0.54 to 0.80 g/cm$^3$.

3. The multi-layer film according to claim 1 wherein the core layer comprises at least 85 wt % of an isotactic propylene homopolymer and up to 15 wt % of a cavitating additive selected from PBT and calcium carbonate.

4. The multi-layer film according to claim 1, comprising a second tie layer between the core layer and the second skin layer.

5. The multi-layer film according to claim 1, wherein the soft polymer is selected from propylene based elastomer, ethylene plastomers, metallocene catalysed linear low density polyethylene as defined hereafter and combination thereof.

6. The multi-layer film according to claim 1, wherein the tie layer comprises from 4 to 8 wt % of soft polymer.

7. The multi-layer film according to claim 1, comprising a cavitated core layer comprising at least 90 wt % of a propylene isotactic homopolymer, a first skin layer comprising a propylene-butene-ethylene terpolymer, a second skin layer comprised of a propylene-butene-ethylene terpolymer and a tie layer between the core layer and each of the skin layer said tie layers comprising less than 10% of a soft polymer, up to 90% of a propylene homopolymer and a pigment, density of said multi-layer film being in the range of from 0.50 to 0.85 g/cm$^3$.

8. Flexible packaging comprising the film according to claim 1.

9. Labeling article comprising the film according to claim 1.

10. The packaging according to claim 8, where said packaging is re-closable.

11. The labeling according to claim 9, where said labeling is re-positionable.

* * * * *